June 12, 1951  B. STOUDT  2,556,987
PIPE DEFORMING MACHINE
Filed Dec. 10, 1949  7 Sheets-Sheet 1
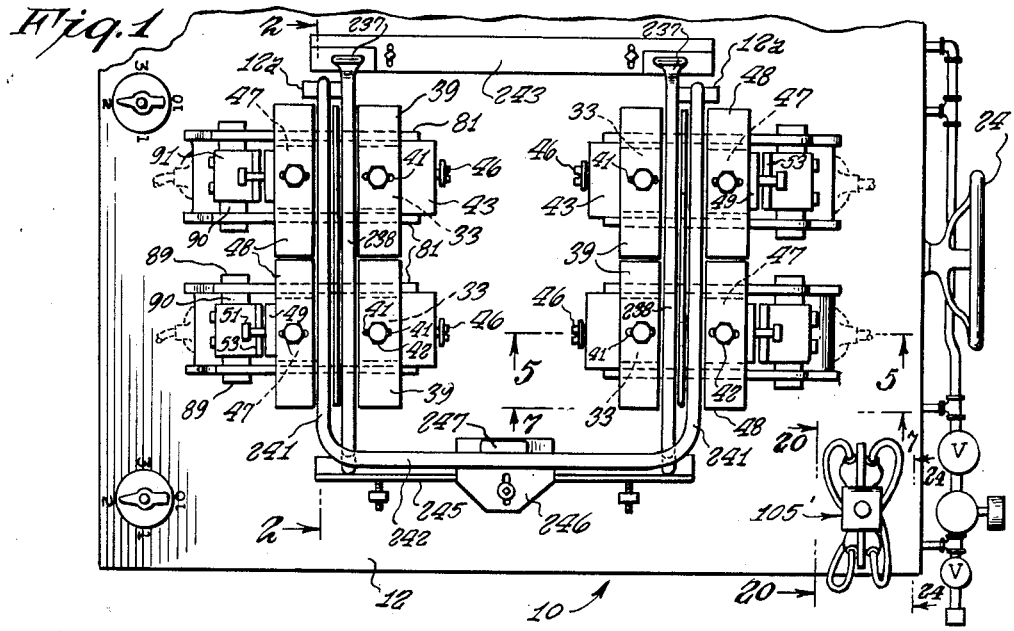
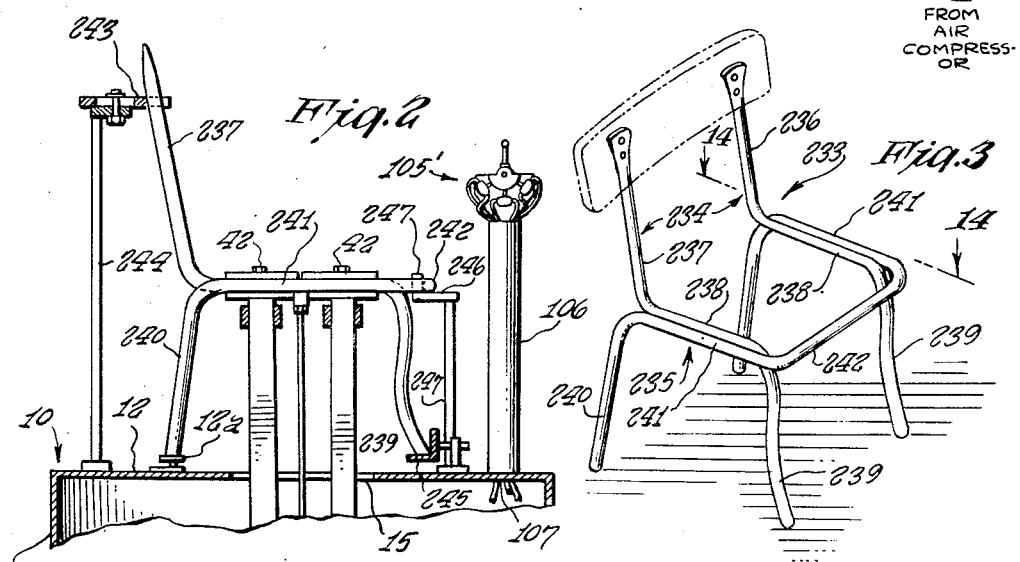
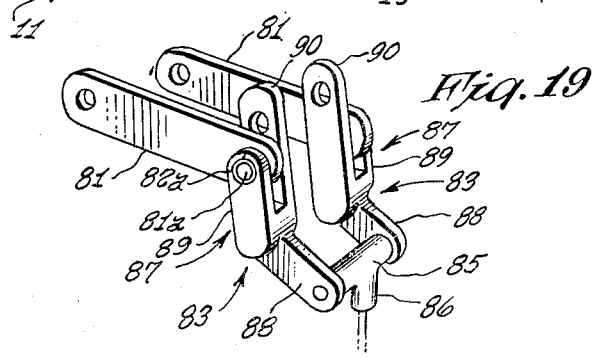
INVENTOR.
BERNARD STOUDT
BY J. Ledermann
ATTORNEY

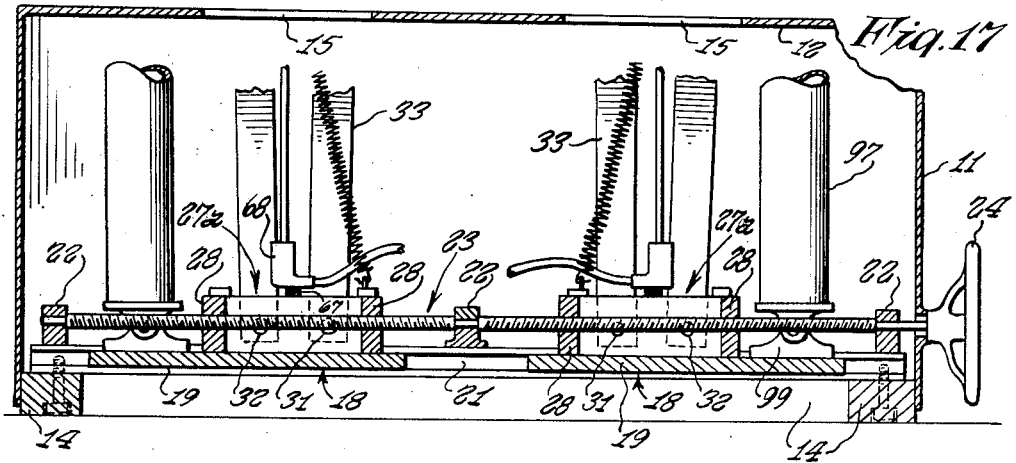
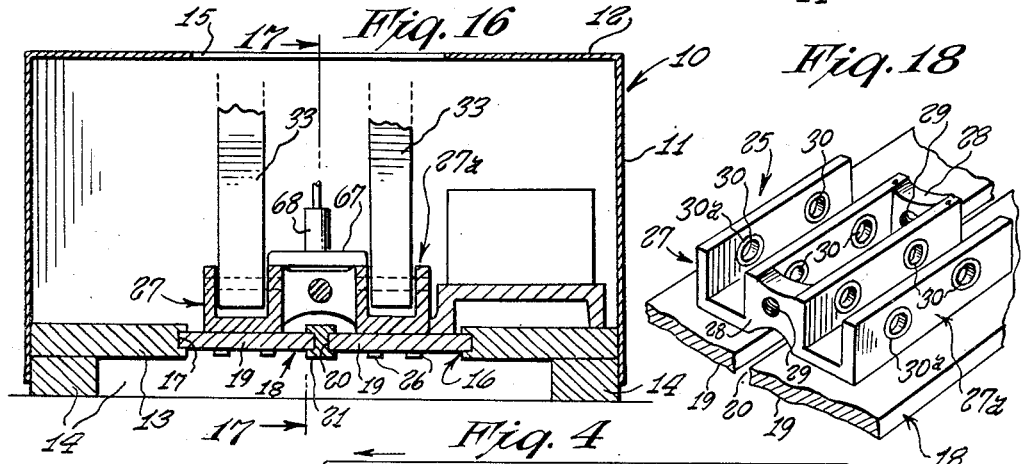
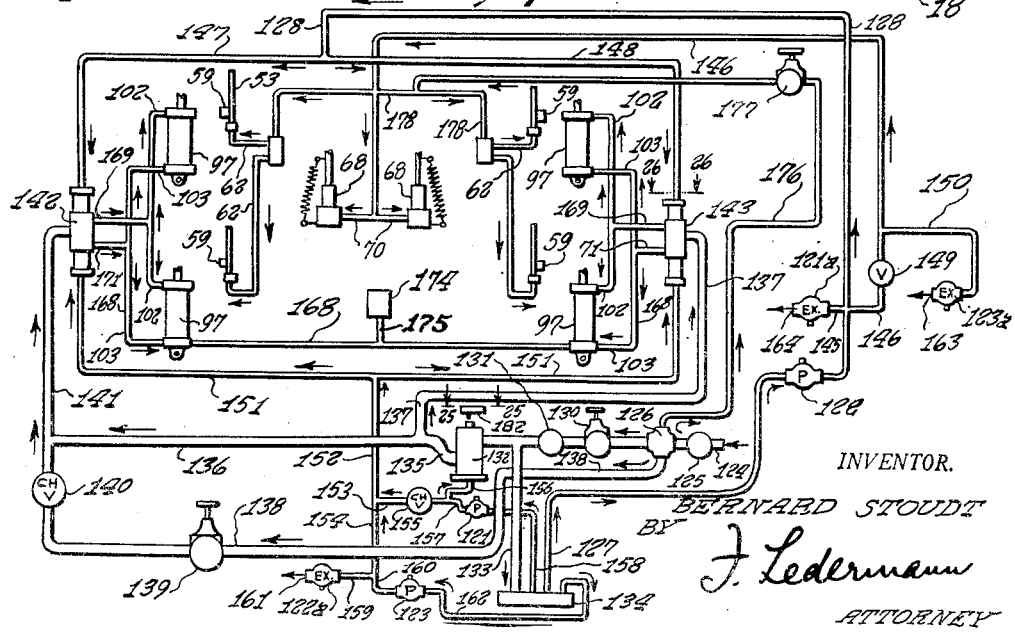

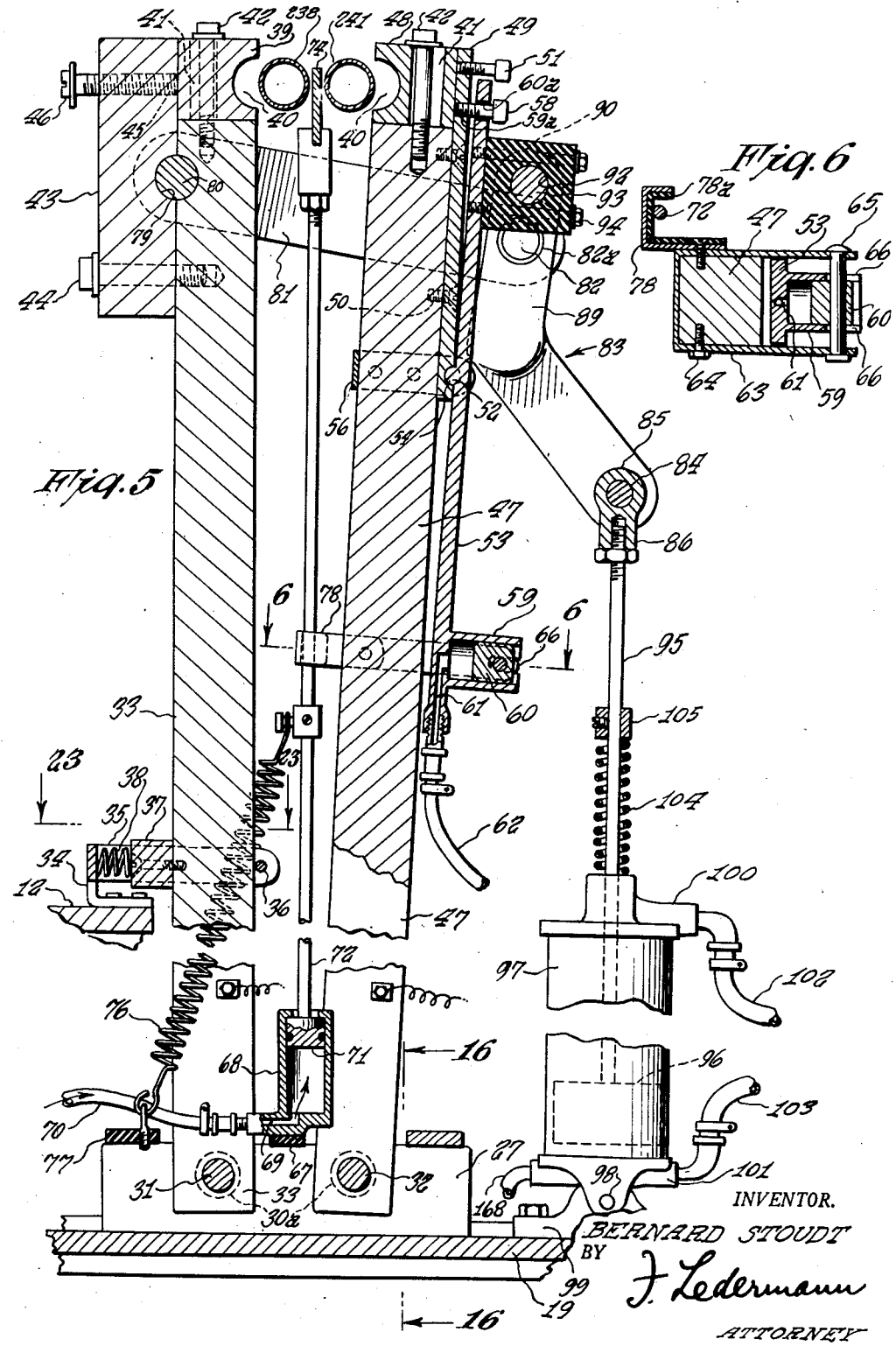

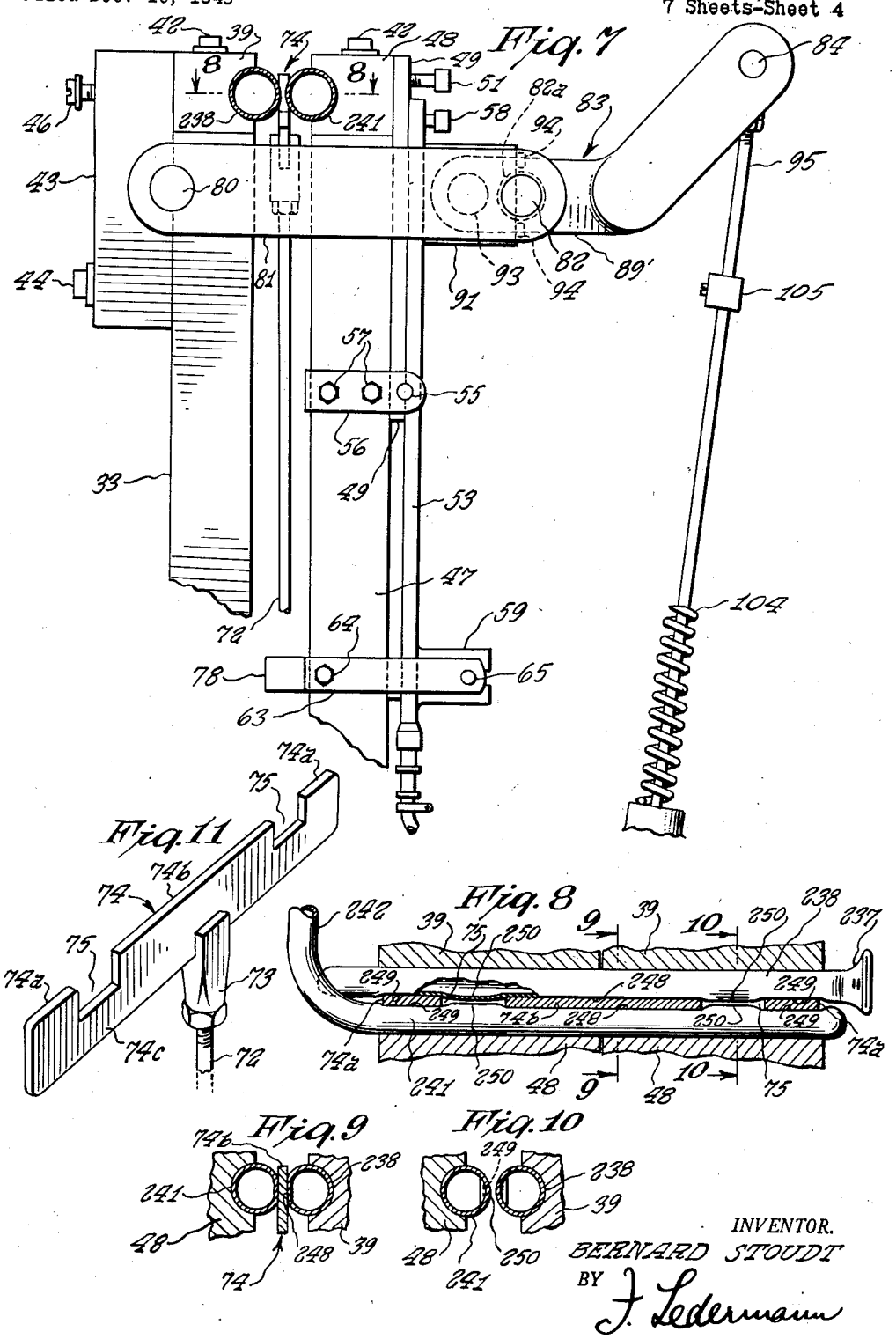

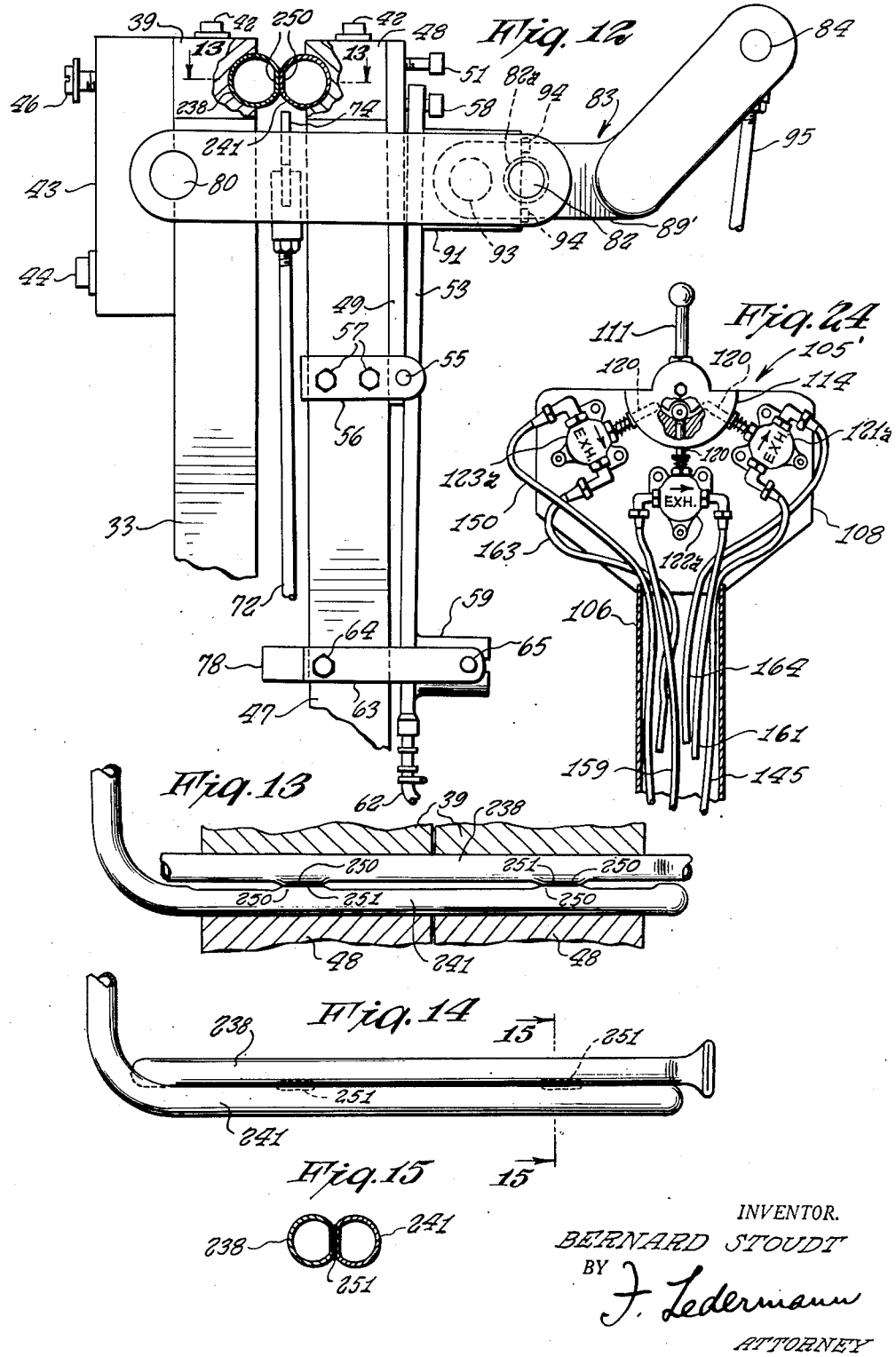

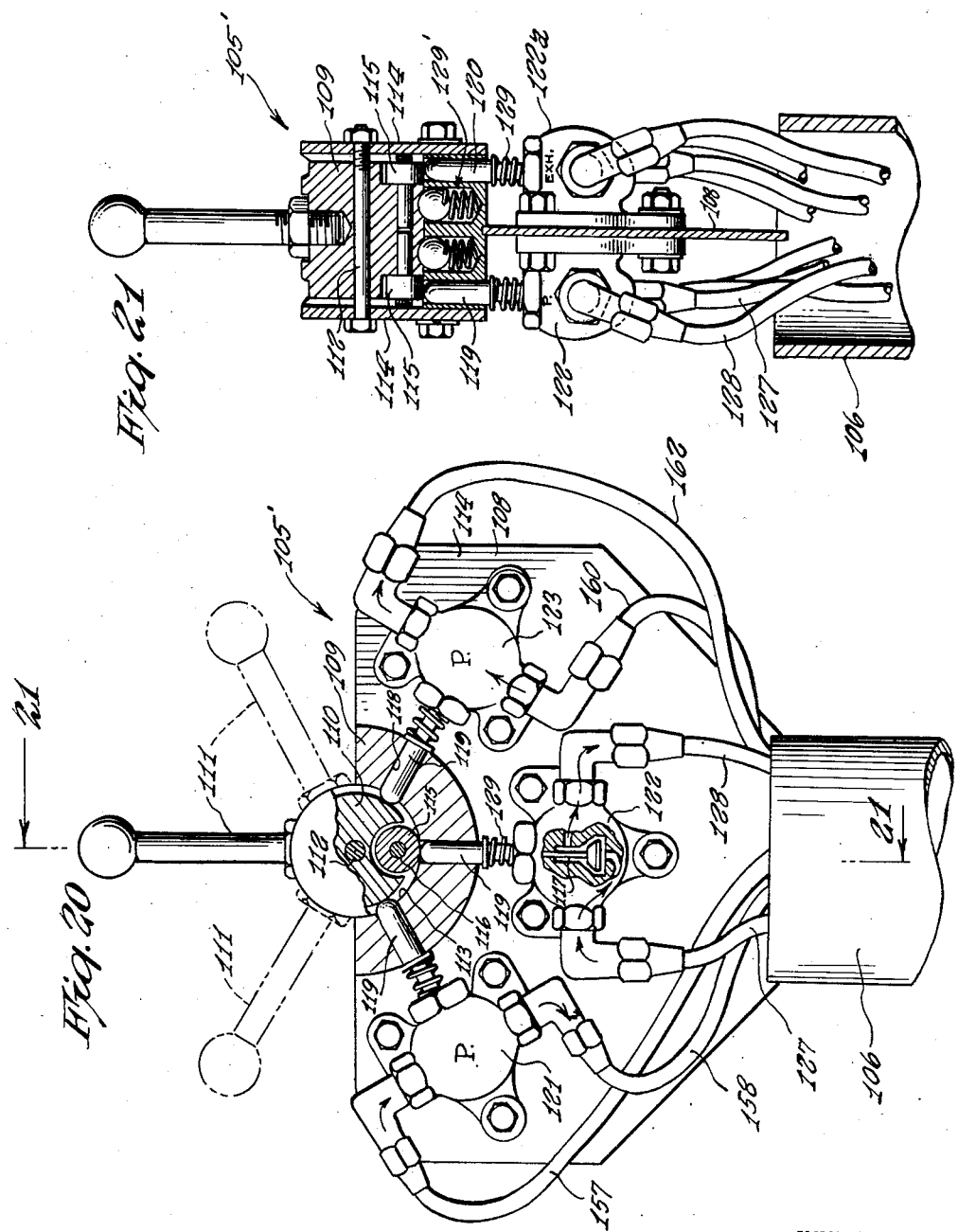
June 12, 1951  B. STOUDT  2,556,987
PIPE DEFORMING MACHINE
Filed Dec. 10, 1949  7 Sheets-Sheet 6
INVENTOR.
BERNARD STOUDT
BY F. Ledermann
ATTORNEY June 12, 1951  B. STOUDT  2,556,987
PIPE DEFORMING MACHINE
Filed Dec. 10, 1949  7 Sheets-Sheet 7
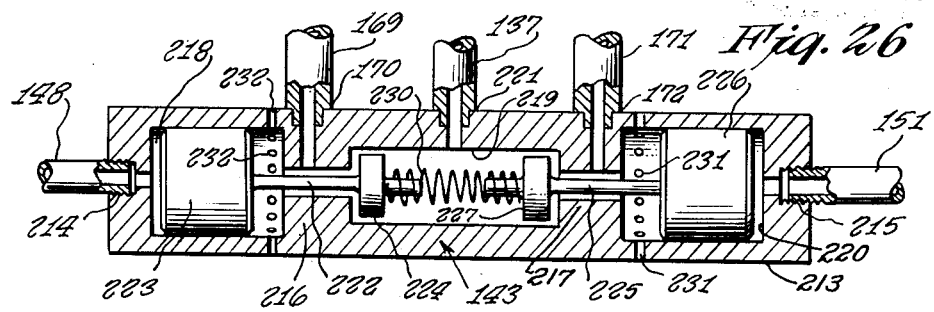
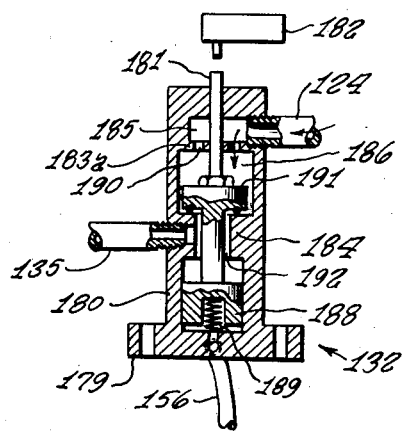
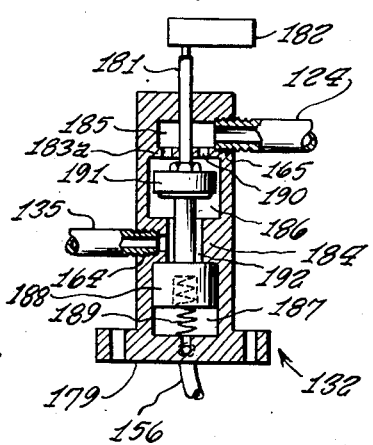
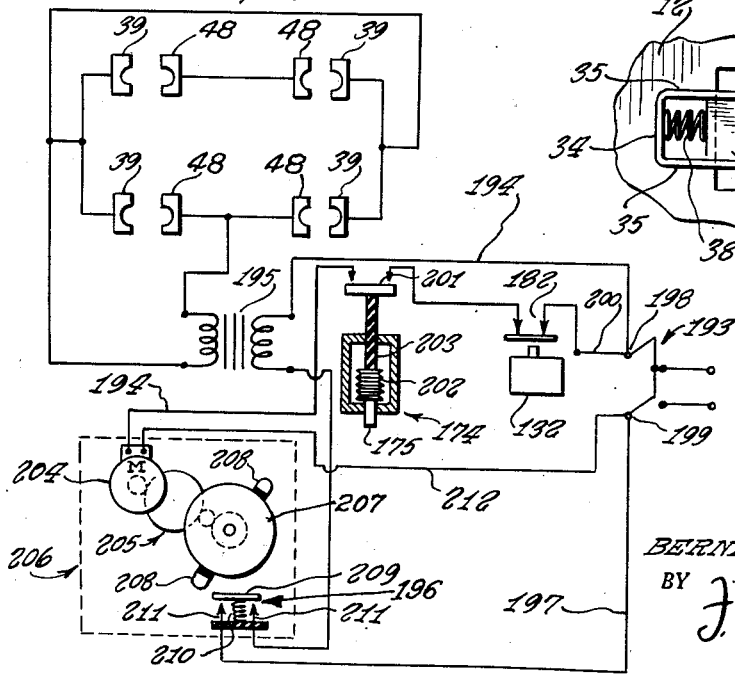
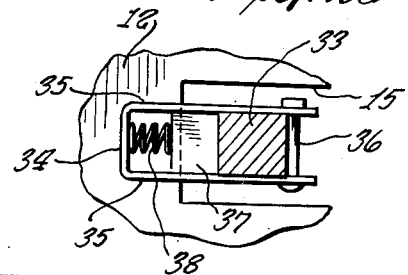
INVENTOR.
BERNARD STOUDT
BY J. Ledermann
ATTORNEY Patented June 12, 1951

2,556,987

UNITED STATES PATENT OFFICE 2,556,987

PIPE DEFORMING MACHINE

Bernard Stoudt, Valley Stream, N. Y., assignor to Ames Spot Welder Co., Inc., Brooklyn, N. Y., a corporation of New York Application December 10, 1949, Serial No. 132,248

12 Claims. (Cl. 153—32)

This invention relates generally to welding machines, and broadly the main object is the provision of a machine having means for first applying pressure between opposed jaw-like electrode dies against two objects to be welded together, with a suitable spacer or former positioned between the objects or work pieces so as to depress mutually opposed portions of the surfaces of the objects and thereby leave mutually opposed bulges on the objects constituting the undepressed areas, and means for removing the former after separating the jaws, and means for then applying pressure against the jaws to restore them to their mutual position of maximum closesness in the above pressing operation and further applying further pressure and moving the jaws still closer together to overcome the space left by removal of the said former thereby bringing the said opposed bulges into mutual contact, the welding circuit being closed during the latter operation and maintained closed for an interval of time terminating while the latter pressure remains applied so that the said bulges, now pliable because of the heating caused by the welding current will become flattened and the two objects will be not only firmly united through the welds but will also be positioned very close together or in actual contact with each other.

One application of the machine of this invention consists in welding together, in the manner above indicated, of two tubes positioned side by side, and this application is pertinent in the manufacture of tubular furniture.

Another object of the invention is the provision of a machine embodying the means above mentioned, having a plurality of suitably spaced and positioned pairs of electrode dies and a suitable plurality of formers, whereby the complete tubular frame of a chair or other article of furniture may be manufactured from three pre-shaped tubular parts or sections in a single progressive and rapid sequence of operations. A single operator working at the machine may thus turn out a large quantity of completed chair frames in a short interval of time.

Still another object of the invention is the provision of suitable air or fluid operated cylinders and accessories including controls, as well as suitable electrical appliances, switches, and connections, to effectively enable the machine to function in the desired manner to attain the desired ends.

The above broad as well as additional and more specific objects will be clarified in the following description wherein characters of reference refer to like-numbered parts on the accompanying drawings. It is to be noted that the drawings are intended solely for the purpose of illustration and that it is therefore neither desired nor intended to limit the invention to any or all details of construction shown or described except insofar as they may be deemed essential to the invention. As an example, whatever insulation is illustrated or described herein is presented merely to enable the welding currents to flow through the electrode dies without becoming short-circuited, as any suitable insulating means may be provided in any desired way at any suitable points of the structure, to attain this end.

Referring briefly to the drawings,

Fig. 1 is a plan view of the machine, with parts omitted, showing the pre-shaped parts of a tubular chair frame inserted therein, in the operation of forming bulges on the opposed surfaces of those sections of the frame which are to be welded together.

Fig. 2 is a fragmentary sectional view taken on the line 2—2 of Fig. 1, with parts omitted.

Fig. 3 is a perspective view of the tubular frame of a chair as it appears when the three separate parts thereof have been welded together in the instant machine.

Fig. 4 is a schematic diagram of the air pressure system used in conjunction with the operation of the machine.

Fig. 5 is an enlarged sectional view taken on the line 5—5 of Fig. 1, showing the electrode dies in spaced relationship prior to instituting the initial action of the machine.

Fig. 6 is a sectional view taken on the line 6—6 of Fig. 5.

Fig. 7 is a fragmentary enlarged sectional view taken on the line 7—7 of Fig. 1, showing the electrode dies after they have been brought to bear against the two tubes about to be welded together, with the former above mentioned positioned between the tubes.

Fig. 8 is a sectional view taken on the line 8—8 of Fig. 7.

Fig. 9 is a sectional view taken on the line 9—9 of Fig. 8.

Fig. 10 is a sectional view taken on the line 10—10 of Fig. 8, with the former removed and not shown.

Fig. 11 is a perspective view of the former plate, also showing fragmentarily its support.

Fig. 12 is a view similar to Fig. 7 but showing the positions of the various parts of the machine at the completion of or during the welding operation on the two tubes, the former plate shown in Fig. 7 between the tubes having been withdrawn and lowered out of the way.

Fig. 13 is a sectional view taken on the line 13—13 of Fig. 12, showing the above-mentioned mutually opposed bulges on the two tubes in mutual contact and welded together.

Fig. 14 is a view taken on the line 14—14 of Fig. 3, showing the two tubes after completion of the final operation of applying continuous pressure to bear against the tubes after the welding has been completed and thereby leveling out the welded bulges and closely juxtaposing the two tubes in, or practically in, linear contact.

Fig. 15 is a sectional view taken on the line 15—15 of Fig. 14.

Fig. 16 is an enlarged fragmentary sectional view taken on the line 2—2 of Fig. 1, showing at the top the lower portion of Fig. 2 and continuing downward therefrom to show the remainder of the machine below that part shown in Fig. 2.

Fig. 17 is a sectional view taken on the line 17—17 of Fig. 16.

Fig. 18 is a fragmentary perspective view, with parts broken away and partly in section, of the floor of the machine, shown in Figs. 16 and 17, and particularly showing the cradle block or casting in which the lower ends of the electrode die carrying arms are pivotally mounted.

Fig. 19 is a perspective view showing the linkage connecting one of the pressure actuated rods with its corresponding electrode die carrying rocker arm.

Fig. 20 is a fragmentary view taken on the line 20—20 of Fig. 1, with parts broken away and partly in section, showing the air control and regulating means.

Fig. 21 is a sectional view taken on the line 21—21 of Fig. 20.

Fig. 22 is a wiring diagram illustrating in simplified form the electrical circuits which may be used to operate the machine.

Fig. 23 is a sectional view taken on the line 23—23 of Fig. 5.

Fig. 24 is a fragmentary view taken on the line 24—24 of Fig. 1, with parts broken away and partly in section.

Fig. 25 is a sectional view taken on the line 25—25 of Fig. 4, showing the pressure changer in normal position with its micro switch closed.

Fig. 26 is a sectional view taken on the line 26—26 of Fig. 4.

Fig. 27 is a view similar to Fig. 25, showing the pressure changer in its other position wherein its microswitch is open.

Referring in detail to the drawings, the numeral 10 indicates the frame of the machine, which includes the vertical supports or walls 11, the platform 12 at the top and the floor 13 at the bottom, the whole being supported on beams or the like 14. The platform 12 is provided with suitable openings 15 therethrough, the drawings showing four such openings, for the passage of the various arms and rods forming part of the machine, as will be presently set forth.

The floor 13 has a longitudinal opening 16 therethrough, whose opposed longitudinal walls are provided with grooves 17. Platforms 18 have their opposed edges slidably registering in the grooves 17, and each platform 18 is composed of two separate co-planar plates 19 separated by a space or slot 20. An I-shaped rail 21 has the mutually adjacent edges of each pair of plates 19 slidably registering between the flanges thereof, as shown in Figs. 16 and 17. The rail 21 is fixed at its ends to the machine frame, as, for instance, to the supporting beams 14. At both ends and at the midpoint of the rail, rigid uprights 22 are mounted and are supported; these uprights contain aligned bearings supporting a worm shaft 23 provided on one end with a right-hand thread and on the other end with a left-hand thread, a hand wheel 24 being rigid with one end of the shaft. Near the mutually adjacent edges of the platform 18, each platform 18 has rigidly secured thereon, as by rivets or bolts 26, a casting 25, shown as a unit in Fig. 18. Each casting 25 comprises a pair of spaced channels 27 and 27a positioned side by side and rigidly joined by end walls 28 which are positioned directly above the slot 20 between the plates 19. The walls 28 of the right-hand (Fig. 17) casting 25 are provided with suitably threaded holes 29 to accommodate the right-hand side of the worm 23, and the walls 28 of the left-hand casting 25 are likewise provided with suitably threaded holes 29 to accommodate the left-hand side of the worm 23. It is thus apparent that as the hand wheel 24 is turned one way or the other, the platforms 18 are brought closer together or moved more widely apart. This provides an adjustment to adapt the machine to the welding together of the tubular frame sections of chairs or other articles of furniture of varying widths, as will become apparent hereinafter.

The opposed walls of each channel 27 and 27a are provided with longitudinally spaced pairs of aligned holes 30 with that pair of holes 30 nearer the center support 22 supporting a pin 31 and the other such pair of holes supporting a pin 32. Each and every hole 30 is provided with a suitable bearing 30a of insulating material. The castings 25 are positioned, as is apparent from Figs. 16 and 17, with the channel 27 of the casting on the right-hand side in alignment with the channel 27 on the left-hand side, and also with the channel 27a on the right-hand side in alignment with the channel 27a on the left-hand side. The pins 31 and 32 are identical.

Each pin 31 is rigid in the bottom of an approximately upright rocker arm 33, there being, obviously, four such rocker arms. On that side of each rocker arm 33 adjacent the transverse median line of the frame 10 (which can readily be pictured on Fig. 1), an angle 34 is secured to the platform 12 of the frame at the edge of the corresponding opening 15. Integral with the opposed vertical edges of the upright wing of the angle 34 are a pair of parallel arms 35 which extend past and engage the sides of the rocker 33, as shown in Figs. 5 and 23. A bolt 36 joins the extremities of the arms 35. A block 37 is secured to the rocker 33, as shown, between the arms 35, and a compression spring 38 normally urges the rocker 33 against the bolt 36. Thus movement of the rocker 33 to the left, Fig. 5, is limited and is resisted by the spring 38. Obviously any other suitable means mounted on the platform 12 or at any other suitable part of the machine, may be provided in place of that just described to serve the purpose of thus limiting and resisting or cushioning such movemnt of the rocker 33.

At its upper end each rocker 33 is provided with an electrode die 39 having a semi-cylindrical gauge 40 formed in the face thereof. The dies 39, as illustrated, are wider than their respective arms 33. Each die 39 is provided with a slot 41 therethrough extending from the top to the bottom of the die, and a screw 42 passing through this slot into the rocker 33 secures the die to the rocker in such fashion that the die is free both to swing on the screw as a pivot and to slide through the distance permitted by the slot 41. A block 43 has a lower bolt 44 securing it to the rocker 33, this block extending upward beyond the top of the rocker 33 and its upper end serves as a backing for the die 39 with the rear wall of which the block is in contact. A threaded opening 45 extends through the block 43 near the top thereof and receives a set screw 46 which serves to push the die to the right, Fig. 5, when the die becomes worn through use.

Mounted on each pin 32 is a second rocker arm 47 which has a complementary die 48 identical to the die 39, secured thereon by a similar screw 42 passing through a similar slot 41 therein. A rigid plate 49 is secured by any suitable means such as, for example, screws 50, against the back of the rocker 47 near the upper end thereof and extending above the top of the rocker and serving as a backing for the die 48. A set screw 51 serves to move the die 48 forward, when necessary owing to wear, in the same manner as the set screw 46 for the die 39. A substantially semi-cylindrical bearing 52 is provided in the lower end of the plate 49. A second rigid plate or arm 53, substantially longer than the plate 49, is positioned as shown in Fig. 5 adjacent the plate 40 and is provided with a substantially semi-cylindrical extension 54 registering in the bearing 52. The extension 54 is provided with pin-like end extensions 55 which register in aligned openings in the ends of the arms of a yoke 56 which is secured, as by bolts 57, to the rocker 47. Thus the plate 53 is free to rock on its fulcrum 54, 52. A set screw 58 passes loosely through an opening 60a through the top of the plate 53 and registers in a threaded opening 59a in the plate 49. Thus the screw 58 serves to limit movement of the upper end of the plate 53 in a clockwise direction, Fig. 5, and it may also assist the set screw 51 in positioning the die 48 to the left of the position of this die shown in Fig. 5.

Mounted on the plate 53 near the lower end thereof, or formed integrally therewith substantially as illustrated in Figs. 5 and 6, is an approximately horizontal cylinder 59 having a block or piston 60 slidable therein. An air inlet channel 61 extends through the plate 53 into the cylinder 59, and an air hose 62 connects with the said channel; the outer (right-hand) end of this cylinder is open. A yoke 63 secured, as by screws 64, to the rocker 47, has a pin 65 through the ends of its arms spaced from the rocker 47. The cylinder 59 is provided with diametrically opposed longitudinal slots 66 in its outer end. The pin 65 passes through, and is immovable with respect to, the piston 60 and it registers in the slots 66. It is apparent that when air under pressure enters the cylinder 59 through the hose 62, the lower end of the plate 53 will be forced to the left (Figs. 5 and 6) and hence the upper end of the plate 53 will swing to the right on its fulcrum 54, 52.

Mounted by means of its insulated base 67 resting on and secured in position by any suitable means, not shown, the mutually adjacent upright walls of the two channels 27 of each casting 25, intermediate the length of said walls, as shown in Figs. 5, 16 and 17, is a vertical cylinder 68 having at its bottom an air inlet 69 to which an air hose 70 is connected. The piston 71 of the cylinder 68 has an elongated rod 72 extending upward and provided on its upper extremity with a fork 73. A preshaped horizontal spacer or former plate 74 is supported in the fork 73. In the example shown for the particular application of the machine herein set forth, the spacer 74 has a pair of spaced rectangular cutouts 75 in its upper edge. It is apparent that upon application of air pressure to the cylinder 68 its piston and hence the rod 72 will rise to the positions thereof shown in Fig. 5, thus positioning the former 74 as shown. A tension spring 76 having one end attached to an insulated plate 77 also bridging the same two walls of the channel 27 and having its other end secured to the arm 72 intermediate the length of the latter, normally urges the arm 72 downward and, of course, to swing to the left. However, an L-shaped extension from the yoke 63, shown at 78 in Figs. 5 and 6, prevents the rod 72 from swinging out of substantially vertical position. The extension 78 may also be provided with a lining of insulation 78a.

A journal 79, as shown in Fig. 5, is formed half in the rocker 33 and the complementary half in the block 43 near the upper end of the rocker 33, and a pin 80 registers in this journal. Link arms 81 have the extremities of the pin 80 registering in one end thereof. The linkage now being described is shown in perspective in Fig. 19. A pair of bell cranks 83, each composed of two arms 87 and 88, are connected at one end on the ends of a pivot pin 84 housed in a sleeve 85 and passing through the ends of the arms 88, the sleeve 85 having integral therewith an internally threaded extension 86. Each bell crank arm 87 is formed in the fashion of a yoke having the two arms 89 and 90, the latter being longer than the former. The other end of each link 81 has a hole 81a therethrough containing a bearing 82a of insulating material. A pin 82 through the hole 81a pivotally connects each link 81 with one of the short arms 89. A block 91 of insulating material, having a journal 92 therethrough, is pivotally mounted between the ends of the arms 90 by means of a pin 93 passing through the journal 92 and supported in the arms 90. Screws 94 pass through the block 91 and secure it rigidly to the plate 53 near the upper end of the latter.

The stem 86 is screwed on the upper end of a piston rod 95 extending from the piston 96 of an approximately vertical air cylinder 97. The lower end of this cylinder is pivotally mounted at 98 on a pedestal 99 bolted to its appropriate floor plate 19. An air inlet 100 is provided at the upper end of this cylinder, with an air hose 102 coupled thereto, and a second air inlet 101 is provided at the lower end of the cylinder with an air hose 103 coupled thereto. A coiled spring 104 surrounds the rod 95 between the cylinder 97 and a collar 105 fixed to the rod.

The air control standard 105' of the machine is shown in Figs. 20, 21 and 24. This comprises a tube 106 positioned on the platform 12, Figs. 1 and 2, over an opening 107 through the platform through which the necessary air hoses pass. An upright plate or the like 108 extends diametrically from the top of the tube 106, and supported on top of this plate with its axis transverse to the plane of the plate, is a semi-cylindrical block 109. A transverse cylindrical rocker 110 is pivotally mounted in the complementary recess 113 of the block 109 by having its axial shaft 112 supported in opposed plates 114 which are secured in any desired manner on the outer sides of the block 109. An operating lever 111 extends from the rocker 110. A roller 115 is mounted on an eccentric pin 116 near the periphery of the rocker 110 so that the roller extends beyond the periphery of the rocker in the manner of a cam, the roller being positioned diametrically opposite the handle 111. The block 109 is provided on each side of the plane through the plate 108 with three spaced radial passages 118 therethrough in which identical stems 119 and 120 are slidably mounted. The stems on one side of the said plane are indicated by the numeral 119 and those on the other side by the numeral 120, this distinction being made to facilitate subsequent clarification of the operation of the machine. Each stem 119 and 120 constitutes an extension of the valve stem of a simple air valve; the stems 119 thus extend from valves 121, 122 and 123, and the stems 120 thus extend from identical valves 121a, 122a, and 123a.

Only one valve, 122, is broken away to show its interior construction, showing the stem 119 as an elongation of the valve stem 117, and it is obvious therefrom that in the position shown in Fig. 20 the valve is unseated to permit air flow in the direction of the arrows from the inlet hose 127 out through the outlet hose 128 because the stem 119 is depressed by the roller 115 in the position of the handle 111 shown in full lines. It is obvious that when the handle is turned in either direction through an arc sufficient to remove the roller 115 from contact with the top of the pin 119 valve 122 will automatically be reseated or closed owing to the force of the usual compression spring 129, with which each of the six valves mentioned is provided. Spring-actuated balls and complementary sockets, shown generically at 129', are provided in standard fashion to releasably lock the block 110 in position in each of the three positions of the lever 111 shown in Fig. 20, and since such provision is common in the art no detailed description thereof is deemed necessary.

Referring to the air diagram of Fig. 4, the air supply line is shown at 124, having a filter 125 interposed therein, passing through a union 126, then through a control valve 130 and an oiler 131 into the uppermost opening 165 (Figs. 25 and 27) of a pressure changer 132, the latter being shown in section in Figs. 25 and 27. A branch 133 leads into a manifold 134. A pipe 135 leads from the intermediate opening 164 of the pressure changer 132 and branches into pipes 136 and 137. From the union 126 a pipe 138 leads through a valve 139 and a check valve 140 to join with the pipe 136 and to continue as a pipe 141 connected to the middle opening 221 of one (shown at 142) of a pair of identical pilot-operated four-way valves 142 and 143. The pipe 137 leads to the corresponding opening of the other four-way valve 143.

From the manifold 134 a pipe 127 leads through the valve 122 and exits therefrom as the pipe 128 which has two branches 145 and 146 tapped thereinto, whence it continues and leads to two branches 147 and 148. The branch 147 leads into one end of the four-way valve 142 and the branch 148 leads into the corresponding end of the other four-way valve 143. The branch 145 leads into the valve 121a and the branch 146 leads through a check valve 149 into two branches 70 each leading into one of the cylinders 68. The pipe 164 leads out of the valve 121a. A branch 150 from the pipe 146, tapped thereinto in the position shown, leads into the valve 123a and emerges as pipe 163. Connecting the other ends of the four-way valves 142 and 143 is a pipe 151 having a pipe 152 tapped thereinto and leading into two branches 153 and 154. The former leads through a check valve 155 and branches into pipes 156 and 157. The branch 157 passes through the valve 121 whence it emerges as pipe 158 and leads into the manifold 134. The pipe 154 branches into pipes 159 and 160; branch 159 enters valve 122a and emerges therefrom as pipe 161, and branch 160 enters valve 123 and emerges therefrom as pipe 162 which leads into the manifold 134. The pipe 156 passes into the bottom compartment 187 of the pressure changer 132.

A pipe 168 connects the bottoms of all four cylinders 97. The pipes 171 tapped into the pipe 168 lead to one pair of corresponding openings 172 in the four-way valve 142; similarly, pipes 169 lead to another pair of corresponding openings 170 in the valve 143. A pressure switch 174 is tapped into the pipe 168 by means of a branch 175. A pipe 176 also leads from the union 126 through a control valve 177 into two branches 178. Each branch 178 again branches into two pipes 62, each of the latter leading to one of the four welding cylinders 59.

As shown in Figs. 25 and 27, the pressure changer 132 comprises a base 179 having a cylinder 180 upright thereon; a piston rod 181 extends slidably through a suitable opening in the top of the cylinder. A normally closed microswitch 182 is positioned above the cylinder with its operating button 183 in alignment with the upper end of the rod 181. Internal flanges 183a and 184 divide the interior of the cylinder into compartments 185, 186 and 187. A piston 188 rigid on the rod 181 is normally urged upward by a compression spring 189. Ports 190 extend through the flange 183a. A valve or collar 191 rigid on the rod 181 within the compartment 186 is of smaller diameter than its said compartment but of larger diameter than the diametrical distance between the ports 190. It is apparent that the length of stroke permitted the rod 181 by the distance between the top of the piston 188 and the flange 184 limits the longitudinal movement of the collar 191 between the position shown in Fig. 25 wherein it seats on the flange 184 and closes the passage through the opening 192, and the position shown in Fig. 27 wherein the collar is positioned intermediate the height of the compartment 186.

Referring to the wiring diagram of Fig. 22, the four inner electrodes are indicated at 39 and the four outer electrodes at 40, in the same relative positions in which they are illustrated in Fig. 1. The supply mains lead through a main switch 193. A lead 194 connects one terminal 198 of the switch with one side of the primary of a transformer 195. The other terminal of the primary leads, through a switch 196 which is further described below, to the other terminal 199 of the main switch 193. A lead 200 running from the terminal 198 has in series therewith the normally closed microswitch 182 of the pressure changer 132 and also the normally open microswitch 201 of the pressure switch 174 previously mentioned. The latter is a simple bellows operated switch, air under pressure entering the pipe 175 expanding the bellows 202 to raise the insulated rod 203 thus closing the switch. Both microswitches 182 and 201 are shown in Fig. 22 in elementary schematic circuit-closer or switch form. Upon exhaustion of the air from the pipe 175 the bellows collapses and thus opens the switch 201. The lead 194 continues from the switch 201 to one terminal of the motor 204, provided with suitable reduction gears 205, of a time controlled circuit closer unit 206. The latter includes a wheel or disc 207 provided with one or more insulated teeth 208 lying in the path of a contactor 209 of the switch 196, which is normally urged upward by a spring 210 so as to clear the contacts 211. As the disc 207 is rotated by the motor 204, the leading tooth 208 will after a brief interval engage and depress the contactor 209 against the contacts 211 and after a further brief interval that tooth will ride past the contactor to permit the spring 210 to again lift the contactor from engagement with the contacts 211. The other lead 212 from the motor 204 goes to the terminal 199 of the main switch. It is to be noted that the time control switch unit 206 is presented merely as an example of a switch or hook-up to provide the desired circuit closing for an interval of time effective after a time interval following the closing of the circuit through the unit, that is, in this case, through the motor 204. It is thus apparent that when all the switches 182, 201 and 196 (all in series with the motor 204) are closed, and only then, will current pass through the welding electrodes 39 and 48.

One of the four-way valves is shown at 242 in Fig. 26, wherein the numeral 213 indicates a cylinder having openings 214 and 215 through the end walls thereof. Internal flanges 216 and 217 divide the cylinder into compartments 218, 219 and 220. The opening 170 passes through the flange 216 and the pipe 169 is connected thereto; a similar opening 172 passes through the flange 217 and the pipe 171 is connected thereto. A middle opening 221 passes through the cylinder wall into the compartment 219 and a pipe 137 is connected thereto. The pipe 148 is connected to the end opening 214 and the pipe 151 is connected to the other end opening 215. A piston rod 222 is slidably mounted in the flange 216 and has on its outer end a piston 223 in the compartment 218 and on its inner end a head 224 in the compartment 219. Similarly, a rod 225 is slidable in the flange 217, having one end in the compartment 220 provided with the piston 226 and having on its other end in the compartment 219, a head 227. An expansion spring 230 normally urges the heads 224 and 227 and hence the rods 222 and 225, apart. Peripherally arranged exhaust ports 232 are provided in the walls of compartment 218 adjacent the flange 216, and similar exhaust ports 231 are similarly provided in the wall of compartment 220 adjacent the flange 217. Fig. 26 shows the relative positions of the various parts of the four-way valve when the control handle 111 is in "neutral" or "second" positions, both of which positions are identical.

The machine, as stated, is illustrated in an application thereof to the welding together of hollow tubes, and more particularly to welding into a single unit the component parts of a chair frame. The finished tubular chair frame is shown at 233 in Fig. 3, showing the frame composed of three members or parts 234, 235 and 236, of which members 234 and 236 are identical. The members 234 comprise the upstanding back arms 237, the horizontal intermediate side sections 238, and the front legs 239. The member 235 comprises the rear legs 240, the horizontal side sections 241, and the front frame section 242 joining the side sections 241. The members 234 and 235 are all pre-formed or -shaped into the shape shown, prior to welding the side sections 241 to the side sections 238 in the manner to be described.

A raised horizontal support 243 held by a standard 244 mounted on the platform 12, serves to support the back sections 237 of the frame parts 234 and an angle 245 supported on the platform 12 serves to support the lower ends of the front legs 239. A raised horizontal support 246 on a standard 247 serves to support the front section 242 of the chair frame member 235, and the upturned inner end 247 of the support 246 aids in positioning this member.

*Operation of the machine*

The machine when not in use has the control lever 111 in the neutral position shown in Fig. 20, whence only valves 122 and 122a are open. It may here be stated that the valves 121, 122 and 123 are all pressure valves adapted to pass air under pressure through or into the machine, for which reason all of these valves bear the legend "P" in Fig. 4, and that the valves 121a, 122a and 123a, all bearing the legend "Exh." in Fig. 4, are all exhaust valves adapted to exhaust air from the machine. In this neutral position, high pressure air at, say, 120 lbs., from the supply line 124, flows into the pressure changer 132 (Figs. 4 and 25), holding the plunger of the latter down and keeping switch 182 closed. This air also flows through the manifold 134 and through valve 122 and thence through pipe 128 and branches 147, 148 into the upper (Fig. 4) ports 214 of the four-way valves 142 and 143, thus pushing piston 223 to the right (Fig. 26) and closing ports 232. Entering air also passes, through union 126, along the pipe 138 where it is reduced by the control valve 139 to, say, 60 lbs., and through the check valve 140 into branches 141 and 136. Through the pipe 136 this air passes through pipe 137. This low pressure air enters the compartment 219 of each four-way valve 142, 143 and pushes the head 227 (Fig. 26) and its rod 225 to the right thus exhausting compartment 220 and sealing the latter from compartment 219. Thus the low pressure air passes out of compartment 219 through pipe 169 into the upper ends of the cylinders 97 thereby drawing the electrode dies or jaws 39 and 48 apart as shown in Fig. 5. High pressure air also passes from valve 122 through pipe 146 into the former plate cylinders 68 to hold the former plates 74 up in the position shown in Fig. 5. The low pressure air also obviously holds the pressure switch 174 open.

The two similar frame sections 234 are then inserted into position as shown in Figs. 1, 2 and 5, that is, with the front legs resting on the angle 245, with their intermediate horizontal sections positioned as shown adjacent the jaws 39 in the plane of the gauge 40, and with the upper ends of the back sections resting against the support 243. Then the frame member 235 is positioned with its rear legs 240 resting on the supports 12a, the side sections positioned adjacent the gauge 40 of the jaw 48 and the front section 242 resting on the support 246, the former plates 74 being positioned between the two tubular frame sections 238 and 241.

The lever 111 is then shifted to the right, Fig. 20, to the position marked "first," wherein only valves 121 and 121a are open and the remaining valves 122, 123, 122a and 123a are closed. In this "first" position, high pressure air still flows through the pipe 124 into the pressure changer 132, and through pipe 133, manifold 134, pipe 158 and valve 121, thence through pipes 157 and 156 into chamber 188 (Fig. 27) of pressure changer 132, and thus high pressure plus the strength of the spring 189 forces the plunger of the pressure changer up thereby opening the switch 182 so that no welding current may pass through the electrodes 39 and 48. Also, through the pipe 157, check valve 155, pipes 153, 152, and branches 151, this air enters the lower ports (Fig. 4) of the four-way valves 142, 143 (the right-hand end port 215, Fig. 26). Thus the piston 226 is moved to the left, closing the ports 231, and likewise moving the head 227 to the left thereby providing passage of air from pipe 137 through pipe 171 and branches 103 to the bottom of the cylinders 97. As seen in Fig. 27, the high pressure air entering the pressure changer compartment 185 through pipe 124 and passing through ports 190 into compartment 186 is then free to pass around collar 191 and through the opening 166 into the pipe 135. At the junction of the pipe 136 with the pipe 141 this high pressure meets the low pressure entering pipe 141 through the check valve 140. However, since this check valve closes on the application of pressure downward (Fig. 4) thereon in excess of pressure upward, the flow of high pressure downward is checked so that high pressure flows only upward along pipe 141. Since exhaust valve 121a is also open in the "first" position, air from the upper ends of cylinders 97 is exhausted through pipes 148 which join with pipe 128 which leads to the open valve 121a. The check valve 149 prevents exhaustion of air from pipe 146 so that the former plates 74 remain in elevated position. Thus the pistons of the cylinders 97 are raised under high pressure to close the jaws 39, 48.

One pair of closed jaws 39, 48 is shown in Fig. 7, with the former plate 74 elevated; actually there is of course a second pair of jaws behind the pair shown in Fig. 7, as is evident from Fig. 1. Owing to the yieldability of the tubular material, the tubular sections 238 and 241, or the two tubes as they may be termed, when they are thus pressed by the two pairs of jaws 39, 40 against the plate 74, suffer their juxtaposed ends to be pressed in by the end wings 74a and their middle portions to be pressed in by the middle upstanding portion 74b, of the plate 74. The positioning of the plate 74 in the "first" as well as the "neutral" position, shown in Fig. 7, is such that the lengthwise portion 74c of the plate below the level of the bases of the cutouts 75 serves merely as a support for the plate sections or wings 74a and 74b as the tubes 238 and 241 do not touch that solid bottom portion 74c.

After the application of the high pressure against the tubes as just mentioned, the resultant deformed tubes are shown in Fig. 8. The opposed pressed in areas deformed by the section 74b of plate 74 are shown at 248, and those areas deformed by the wings 74a are shown at 249. Thus, opposed bulges 250 are left intact in the tubes 238 and 241 at the areas between which the cut-outs 75 of the plate 74 were positioned. Thus, in the "first" position of the lever 111 both pairs of the tubes 238, 241 are thus deformed to provide spaced pairs of juxtaposed bulges 250.

The lever 111 is then moved back to the original or "neutral" position, whence the "second" position is identical to the "neutral" position. In the "second" position the same conditions therefore apply in the air diagram of Fig. 4 and in the various valves therein, as described above. In the "second" position, therefore, air is released from the bottom of cylinders 97 and from the bottom opening of the pressure changer 132 through pipe 156; thus the jaws 48 are restored to their released position as shown in Fig. 5 and the piston 188 falls to restore the various parts of the pressure changer 132 to the position shown in Fig. 25, with the switch 182 closed.

Then the lever 111 is swung into "third" position, in which only the valves 123 and 123a are open. Hence, air from the former plate cylinders 68 is exhausted through pipes 70, 146, 159, through valve 123a and pipe 163 (Fig. 4) thus permitting the rod 72 (Fig. 5) to carry the plate 74 down from between the tubes 238, 241 into the position thereof shown in Fig. 12, the speed of action of the rod 72 in descending being hastened by the spring 76. High pressure air from pipe 124 then flows through pipe 162 from the manifold 134, through valve 123, pipe 160, pipe 154 and brances 151 into the lower (Fig. 4) ends of the four-way valves 142, 143, that is, into the end port 215, Fig. 26, thus pushing the piston 226 to the left. Obviously, on opening exhaust valve 123a air is exhausted from the top end ports (Fig. 4) of valves 142, 143 (port 214, Fig. 26) through branch pipes 147 and 148, pipes 128 and 146, through check valve 149 into pipe 150 and out through valve 123a. Air also enters at high pressure through the pressure changer port 165 and holds the plunger thereof down (Fig. 25). High pressure air flowing through pipe 138 is, as before mentioned, reduced to low pressure by the valve 139, and this low pressure air enters the middle compartment 219 of the four-way valves through pipes 137 and 141 and exits through pipes 171 to the bottom of the cylinders 97, again raising the jaws 49, but this time under low pressure, into the closed position. Since the jaws 39 and 48 in their latter position are at the maximum relative mutual closeness to each other permitted by the linkage 83 acted upon by the raised piston 96 (Fig. 7), and owing to the thickness of the plate 74 between the tubes 238 and 241, the tubes would not be able to contact each other but for the following provision when the plate 74 is removed from between the tubes. It is therefore necessary to utilize the cylinder 59 (Figs. 5 and 7) in order to permit the jaw 48 to move on under suitable pressure toward the jaw 38 to provide for the space vacated by the plate 74. As shown in Fig. 4, a pipe 176 provides, through the control valve 177 and branch pipes 178, 62, continuous air pressure in the cylinders 59 in all positions of the lever 111, but the valve 177 reduces the high pressure to a low pressure of, say, 70 lbs. so that the cylinders are always charged with this pressure. Hence, when the jaw 48 is moved into the closed position shown in Fig. 7, the action of the cylinder 59 on the plate 53, as previously described, will cause the upper end of the plate 53 to press against the block 91 so that, acting through the fulcrum 52, 54, the arm 47 will be swung to the left (Fig. 5) from the position shown in Fig. 7 to that shown in Fig. 12. It is to be noted that when the jaws are closed in the above-mentioned "first" position with the plate 74 between the tubes, as shown in Fig. 7, the existence of the low pressure in the cylinders 59 does not interfere with the shaping or forming action on the tubes described above.

Thus, the additional distance which the jaw 48 is moved by the action of the cylinder 59, moves the tube 241 against the tube 238 until the juxtaposed bulges 250 are in mutual contact as shown in Fig. 13. As the switch 182 is now closed, as stated above, and as the pressure switch 174 is also now closed as it always is when air pressure is applied to the lower ends of the cylinders 97, it is apparent that the circuit through the motor 204 (Fig. 22) is also closed. Hence the contact disc will begin to rotate as the tube 241 is moving toward the tube 238 and, after a brief interval one of the teeth 208 will press down the contactor 209 to close the primary circuit of the transformer 195 and thus pass welding current through the four pairs of electrode dies or jaws 39, 48. The timing of the switch 196 is preset to permit flow of the welding current for the desired interval which may be, preferably, about thirty seconds. Welding current of course begins to flow as soon as the opposed bulges 250 of the tubes touch each other and the contact between these bulges is at first only linear. However, as the applied pressure of the jaw 48 continues to work or build up after the flow of welding current has started and as the welded areas as well as their environments become very hot and pliable, the continued application of this pressure presses the two tubes closer together. Therefore, when the flow of welding current is stopped by opening of the switch 196 after thirty seconds, the pressure against the tubes continues to compress the pliant bulges 250 to flatten them out and bring the tubes into complete linear contact with each other as shown in Fig. 14. The positions of the tubes at, during or immediately after the welding current flow, may be considered indicated in Fig. 13, prior to final pressing of the hot tubes against each other as just described.

Finally, the lever 111 is again returned to "neutral" position, restoring the air and electrical connections previously described for this position, and the completely welded chair frame 223 is lifted from the machine. Obviously, with the tubes 238 and 241 thus formed in complete linear contact with each other in the final form, there is no space visible between the tubes when looking down on the frame from above, which is a very much desired condition for a good job.

Thus, in the manner illustrated and described, a tubular chair frame may be readily and quickly formed out of three pre-shaped parts, the two like parts 234 and the part 235. One operator is all that the machine requires, and by having the parts 234 and 235 readily at hand he may thus turn out completed tubular chair frames at a high rate.

The machine may, of course, be used with but a single pair of jaws 39, 48 instead of the four pairs shown, or, again, with only two pairs positioned side by side, as on either side of Fig. 1, the instant machine having been designed, as illustrated, for the specific purpose of welding chair frames. Moreover, the machine may be used to pre-shape and weld together any two objects or work pieces possessing the required property of being formable by the forming operation (of the plate 74) described in the "first" position, above.

It is of course obvious that, without first forming bulges 250 or their equivalent on the two tubes, upon being brought together into welding contact with each other the current would pass between the small high spots between the tubes and thus pit the tubes irregularly and in general form a most unattractive and undesirable weld. The machine herein described permits of a continuous method for obtaining a unitary and desirable end result, that of securely welding together two objects, such as, merely by way of example, the two tubes 238 and 241, and finishing them off by bringing the two tubes into complete linear contact with each other.

Obviously, modifications in form or structure may be made without departing from the spirit or scope of the invention.

I claim:

1. A machine comprising a frame having mounted thereon in horizontal position two pairs of complementary jaws having one jaw of each of said pairs movable with respect to the other jaw thereof, said pairs of jaws being positioned with all of said jaws parallel with each other and with one of said pairs spaced from the other of said pairs along an imaginary line passing through the median lines of all of said jaws and at right angles to said jaws, said machine being adapted to work on two like tubular frame members and a third tubular frame member, each of said like frame members comprising a horizontal intermediate side section having an upstanding back section extending from the rear end thereof and a front leg section extending downward from the front end thereof, said third frame member comprising two parallel intermediate side sections joined at their front ends by a transverse section and having rear leg sections extending downward from their rear ends, two former plates having longitudinally spaced cut-outs therein, said frame members being adapted to be mounted in substantially upright position in said machine with said side sections of one of said two frame members positioned between one of said pairs of jaws and the said side section of the other of said two members positioned between the other of said pairs of jaws and with said side sections of said third frame member positioned adjacent and juxtaposed to said side sections of said two frame members between said pairs of jaws, means for moving said former plates into position between the jaws of each of said pairs of jaws and between said side sections positioned between said jaws of each of said pairs of jaws as aforesaid, means for forcing said movable jaws against said other jaws to clamp said side sections between each of said pairs of jaws against said former plates thereby depressing some of the opposed surfaces of the two juxtaposed side sections between each of said pairs of jaws and leaving undepressed those surfaces of said side sections positioned adjacent said cut-outs of said former plate, said undepressed surfaces constituting opposed bulges from said depressed surfaces, and means for moving said movable jaws away from said other jaws.

2. The machine set forth in claim 1, having means for moving said former plates out of position between said side sections positioned as aforesaid between said jaws of each of said pairs of jaws, means for actuating said first-named jaw moving means to move said movable jaws toward said other jaws after said former plate has been moved out of position as aforesaid, means for actuating said second-named jaw moving means, and additional means for moving said movable jaws closer toward said other jaws thereby tending to flatten out said bulges.

3. A machine comprising a frame having two opposed jaws mounted thereon, means for moving one of said jaws a predetermined distance toward the other of said jaws, said jaws being adapted to have work pieces of material possessing a degree of yieldability such as, for example, metal tubing, positioned side by side between said jaws, means for moving said one of said jaws away from said other of said jaws to the original position of said one of said jaws, a movable member positioned between said work pieces, said member having at least one cut-out therein positioned between said work pieces when said member is positioned between said work pieces, said jaws upon application of said first-named jaw moving means clamping said work pieces against the opposed sides of said member thereby depressing the juxtaposed surfaces of said work pieces except for those surfaces thereof adjacent said cut-out and thereby leaving said last-named surfaces protruding from said work pieces in the manner of bulges therefrom.

4. The machine set forth in claim 3, having means for moving said member into said position between said jaws and having means for moving said member out of said position between said jaws, and additional means for moving said movable jaw an additional distance beyond said predetermined distance to accommodate for the space vacated by said member as aforesaid thereby bringing said work pieces together with said juxtaposed bulges in mutual contact.

5. A machine comprising a frame, a pair of normally spaced apart juxtaposed arms, one of said arms being pivoted to said frame, said arms having opposed jaws thereon, means for alternately swinging said pivoted arm a predetermined distance toward said other arm thereby moving the said jaw thereon toward the said jaw on said other arm and swinging the said pivoted arm the said distance away from said other arm, said jaws adapted to have work pieces of somewhat yieldable material such as, for example, two metallic tubes, positioned therebetween, a movable member adapted to be positioned between said tubes and hence between said jaws, said member having at least one cut-out therein positioned between said tubes when said tubes are positioned between said jaws and said member is positioned between said tubes, means for actuating said arm swinging means to move said pivoted arm as aforesaid, said jaws upon application of said last-named means clamping said tubes against said member thereby depressing the juxtaposed surfaces of said tubes except for those surfaces of the tubes adjacent said cut-out and thereby leaving said last-named surfaces protruding from said tubes in the manner of bulges, means for positioning said member between said jaws as aforesaid, means for actuating said first-named means for moving said pivoted arm away from said other arm, and means for moving said member out of position between said arms.

6. The machine set forth in claim 5, having additional means for swinging said pivoted arm a distance beyond said predetermined distance toward said other arm thereby bringing said bulged tubes together with said bulges thereof in mutual contact.

7. The machine set forth in claim 5, at least one of said jaws having means for varying the position thereof on its said arm in either direction on an imaginary line through and at right angles to said jaws.

8. The machine set forth in claim 5, said arm swinging means comprising a cylinder mounted on said frame adjacent but spaced from said pivoted arm and having a piston slidable therein, said piston having an elongated piston rod extending from one end of said cylinder, a bell crank having one arm thereof pivoted at one end to the end of said rod, the other arm of said bell crank comprising two parallel members, one of said parallel members being longer than the other thereof, a link pivoted at one end to said other of said pair of arms and extending past said pivoted arm, the other end of said link being pivoted to the free end of the said shorter of said parallel members, a block pivotally mounted on the free end of said longer of said parallel members and having one face thereof positioned against said pivoted arm, said cylinder having a port in said one end thereof and a fluid line connected to said port, said cylinder having a second port in the other end thereof and a second fluid line connected with said second port, and selective means for passing fluid through said first-named fluid line and simultaneously exhausting said second fluid line and for passing fluid through said second fluid line and simultaneously exhausting said first-named fluid line.

9. The machine set forth in claim 5, said arm swinging means comprising a cylinder mounted on said frame adjacent said pivoted arm and having a piston slidable therein, said piston having an elongated piston rod extending through one end of said cylinder, a bell crank having one arm thereof pivoted at one end thereof to the end of said rod, the other arm of said bell crank comprising two parallel members, one of said parallel members being longer than the other thereof, a link pivoted at one end to said other of said pair of arms and extending past said pivoted arm, the other end of said link being pivoted to the free end of the said shorter of said parallel members, a block pivotally mounted on the free end of the said longer of said parallel members and having one face thereof positioned against said pivoted arm, said cylinder having a port in said one end thereof and a fluid line connected to said port, said cylinder having a second port in the other end thereof and a second fluid line connected with said second port, and selective means for passing fluid through said first-named fluid line and simultaneously exhausting said second fluid line and for passing fluid through said second fluid line and simultaneously exhausting said first-named fluid line, said means for positioning said member between said jaws as aforesaid comprising a cylinder mounted on said frame adjacent said arms and having a port in the head end thereof, a piston slidable in said last-named cylinder and having an elongated piston rod thereon extending from one end of said last-named cylinder, said member being secured to the upper end of said last-named rod, a fluid line connected with said last-named port, said last-named rod having such a length that when said last-named cylinder is charged with fluid said member is positioned as aforesaid between said jaws, exhausting of said fluid from said last-named cylinder permitting said last-named piston to move to the head end of its said cylinder thereby drawing said member out of the said position thereof between said jaws, means normally urging said last-named rod toward the head end of said last-named cylinder, and selective means for alternately passing fluid through said last-named fluid line and exhausting said last-named fluid line.

10. The machine set forth in claim 5, said arm swinging means comprising a cylinder mounted on said frame adjacent said pivoted arm and having a piston slidable therein, said piston having an elongated piston rod extending from one end of said cylinder, a bell crank having one arm thereof pivoted at one end thereof to the end of said rod, the other arm of said bell crank comprising two parallel members, one of said parallel members being longer than the other thereof, a link pivoted at one end to said other of said pair of arms and extending past said pivoted arm, the other end of said link being pivoted to the free end of the said shorter of said parallel members, a block pivotally mounted on the free end of said longer of said parallel members and having one face thereof positioned against said pivoted arm, said cylinder having a port in said one end thereof and a fluid line connected to said port, said cylinder having a second port in the other end thereof and a second fluid line connected with said second port, and selective means for alternately passing fluid through said first-named fluid line and simultaneously exhausting said second fluid line and for passing fluid through said second fluid line and simultaneously exhausting said first-named fluid line, additional means for swinging said pivoted arm a distance beyond said predetermined distance toward said other arm thereby bringing said bulged tubes together with said bulges thereof in mutual contact.

11. The machine set forth in claim 5, said arm swinging means comprising a cylinder mounted on said frame adjacent said pivoted arm and having a piston slidable therein, said piston having an elongated piston rod extending from one end of said cylinder, a bell crank having one arm thereof pivoted at one end thereof to the end of said rod, the other arm of said bell crank comprising two parallel members, one of said parallel members being longer than the other thereof, a link pivoted at one end to said other of said pair of arms and extending past said pivoted arm, the other end of said link being pivoted to the free end of said shorter of said parallel members, a block pivotally mounted on the free end of said longer of said parallel members and having one face thereof positioned against said pivoted arm, said cylinder having a port in said one end thereof and a fluid line connected to said port, said cylinder having a second port in the other end thereof and a second fluid line connected to said second port, and selective means for alternately passing fluid through said first-named fluid line and simultaneously exhausting said second fluid line and for passing fluid through said second fluid line and simultaneously exhausting said first-named fluid line, additional means for swinging said pivoted arm a distance beyond said predetermined distance toward said other arm thereby bringing said bulged tubes together with said bulges thereof in mutual contact, said additional means comprising an elongated arm fulcrumed intermediate its length against said pivoted arm, one end of said elongated arm being positioned between said block and said pivoted arm, and means normally urging said one end of said elongated arm against said block and thereby through the fulcrum of said elongated arm urging said pivoted arm farther toward said other arm.

12. The machine set forth in claim 3, having a rod slidably mounted in substantially vertical position below the level of said jaws, said member being mounted on the upper end of said rod, and means for alternately raising said rod to position said member between said jaws and lowering said rod to position said member below the level of said jaws.

BERNARD STOUDT.

REFERENCES CITED

The following references are of record in the file of this patent:

UNITED STATES PATENTS

| Number | Name | Date |
|---|---|---|
| 904,540 | Lachman | Nov. 24, 1908 |
| 986,845 | McIntyre | Mar. 14, 1911 |
| 2,021,173 | Clark | Nov. 19, 1935 |
| 2,203,151 | Iversen | June 4, 1940 |
| 2,305,042 | Thacker | Dec. 15, 1942 |